July 23, 1935.  M. W. PEHOTSKY  2,009,199
BATTERY BRACKET
Filed May 7, 1934

Milton W. Pehotsky
INVENTOR

BY
ATTORNEY

Patented July 23, 1935

2,009,199

UNITED STATES PATENT OFFICE 2,009,199

BATTERY BRACKET

Milton W. Pehotsky, Cleveland, Ohio

Application May 7, 1934, Serial No. 724,333

12 Claims. (Cl. 180—68.5)

This invention relates to improved means of mounting a battery, particularly in a motor vehicle or the like, and aims generally to improve existing means for that purpose.

More particularly, the invention aims to provide a new and improved mounting or bracket enabling the storage battery to be mounted on a motor vehicle in such a way that electrical resistance is lessened by providing shorter battery cables than those in general use, by permitting more ready access to the battery to check the acid level and to prevent corrosion at the terminals and by means of conducting electrical current so that it will pass through a battery conductor beyond the frame of the vehicle as is now the usual and customary practice.

A further object of the invention is to provide a simple inexpensive bracket or support for a battery that is adapted to be connected to the dash of a motor vehicle with the battery positioned forwardly of the dash and within the motor compartment of the vehicle so that the battery may be readily accessible for maintenance and repair by merely lifting the hood covering the engine compartment of the vehicle. More specifically the battery support has novel features of construction permitting ready replacement and removal of the battery and also provides a support that will readily accommodate batteries of varying widths.

In the accompanying drawing I have illustrated one preferred embodiment of the invention, it being understood that the invention may be varied in form or detail without departing from the spirit thereof.

In the drawing—

Figure 1:
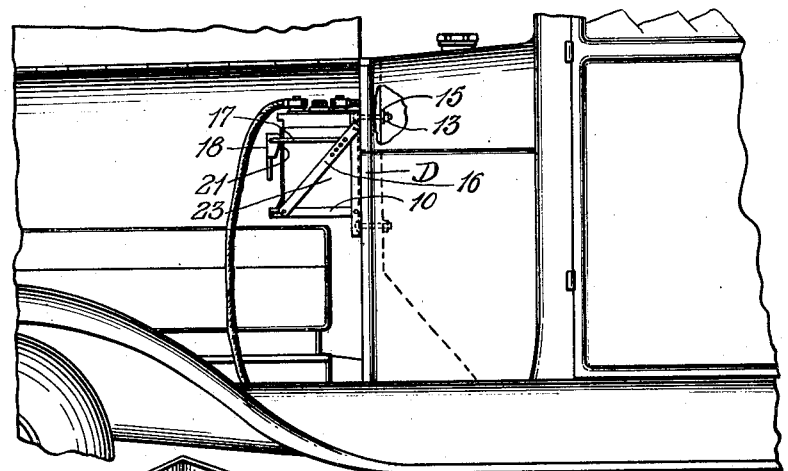
Fig. 1 is a diagram illustrating conventionally the dash motor compartment and hood of a motor vehicle with my improved battery holder in place and shown in elevation.
Figure 2:
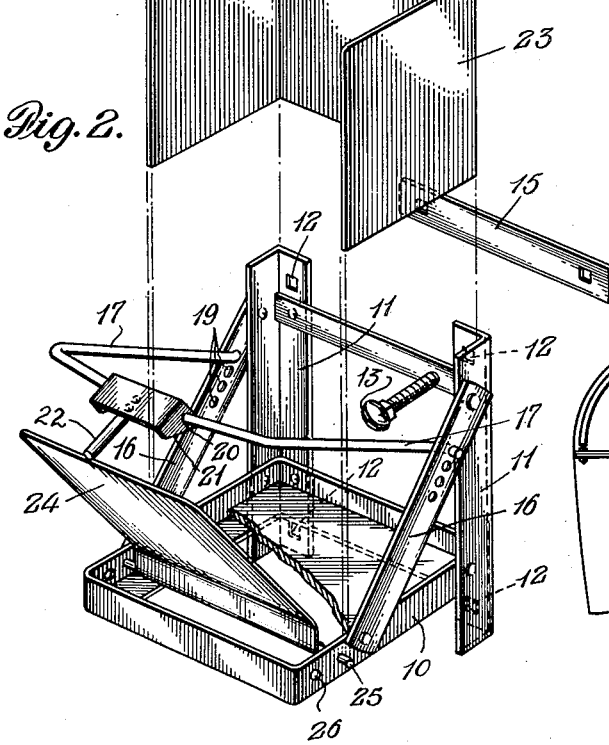
Fig. 2 is a perspective view of the battery bracket.

According to the improved form of the invention illustrated in the drawing, the bracket may comprise a base 10, being generally in a rectangular form and preferably constructed of angle bar of suitable weight calculated to the load of the battery to be supported. Advantageously, the base 10 may be constructed of a single bar notched as shown and bent to right angular form, the ends being securely connected together in any conventional manner as by riveting. It will be understood that the angle bar base 10 is advantageously of a size to accommodate the battery for which the bracket was made so that the base 10 will provide a horizontal support for the battery as well as a vertical flange engaging the sides of the battery to steady it upon the support.

The base 10 is connected to uprights 11 advantageously of angle bar construction provided at its opposite ends with bolt holes 12 for the reception of fastening means 13, by means of which the uprights and bracket generally may be secured to the dash D of a motor vehicle. The base 10 is connected to the uprights at a point intermediate the vertically spaced bolt holes 12 and preferably is so arranged that the center of gravity of the battery supported by the base 10 will be substantially midway between the vertically spaced bolt holes 12. The uprights 11 may be braced by means of a strap or bar to prevent spreading of the uprights and to prevent a variation in the tension upon the battery clamping member later to be described.

The battery bracket or support is preferably suspended or supported on the forward face of the dash by means of four fastening members 13 passing through the four spaced bolt holes 12 and engaging and reinforcing the stiffening bar 15 on the rear face of the dash. This stiffening bar acts to distribute the load throughout a substantially large area and reduces materially the tendency of the dash to crystallization and tear due to vibration of the battery when the vehicle is in motion.

The battery bracket may be advantageously reinforced by means of diagonally positioned braces 16 and the battery may be advantageously securely clamped in position relative to the support by means of a clamp comprising a bail member 17 hingedly connected to the support and including a cam-shaped lever 18 adapted to engage and clamp the battery securely to the support. The braces 16 are provided with a plurality of openings 19 to receive adjustably the ends of the bail whereby the bail, and hence the bracket, generally may be adjusted to accommodate batteries of varying widths. The cam lever advantageously may be formed of a single piece of strip metal bent to channel form and pivoted to the bail as at 20, the extensions of the channel being formed as cam faces 21. A hand lever 22 connected to the cam 18 provides suitable means for operating the cam.

It is desirable to enclose the sides of the battery in a metal case to keep the battery case free from dirt, grease and oil, and preferably I provide a channel-shaped housing 23 adapted to be removably placed upon the supporting base 10, enclosing the rear face, and sides of the battery. The front cover member 24 may be suitably connected to a hinge piece 25 rotatably mounted in openings 26 formed in the sides of the base so that the front cover plate may be adjusted relatively to the back of the bracket to accommodate batteries of varying widths by the positioning of the hinge pin 25 in the proper openings 26.

When the battery is clamped in the bracket by means of tension placed on the bail 17 by means of a cam member 18, the housing 23 cooperates with the cover 24 to reinforce the sides of the battery and prevent damage thereto.

Figure 3:
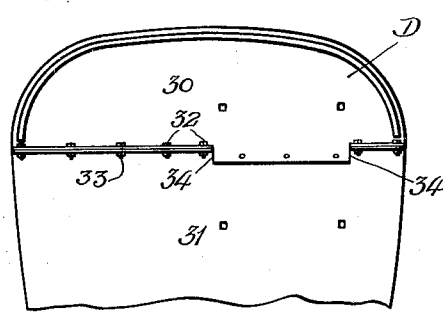
Fig. 3 is a view illustrating one manner of securing my improved battery support upon a motor vehicle having a two-part dash construction.

In Fig. 3 I have illustrated one manner of applying my new battery support to motor vehicles having a two-part dash comprising upper and lower sections 30 and 31 secured together along a flanged joint 32 and securely bolted as at 33. In applying my improved battery support to such a dash it is obviously necessary that the uprights 11 lie flush with the dash and therefore I shear flanged joint 32 at points 34 and bend down the intermediate portion of the joint so that the uprights may be positioned between the shear points 34 and lie substantially flush with the forward face of the dash.

Advantages of my invention reside in the novel manner of mounting the battery within the engine compartment of the vehicle and upon the forward face of the dash whereby it is readily available for inspection and maintenance upon mere lifting of the hood. In this way the battery may be maintained properly filled and corrosion kept free from the terminals. The positioning of the battery adjacent the engine compartment of the vehicle permits of the use of shorter cables and therefore lessens the resistance to the current supplied by the battery, and provides for more efficient battery operation. A further advantage is that the cables are removed from close proximity to the brake and clutch pedal, and gasoline lines, materially reducing fire hazard of the vehicle. No acid can spill on the occupants of the vehicle in the event of a car turn-over accident.

Numerous other advantages will be obvious to those skilled in the art.

Although the invention is particularly adapted to the mounting of batteries on motor vehicles, in some of its aspects it is equally applicable to the support of batteries for other purposes, such as for motor boats, trains or other locations where batteries are used.

I claim:

1. In combination with a motor vehicle having a dash including a substantially vertical portion, an engine compartment forwardly of the dash and a hood over the engine compartment, of a battery support supported against the vertical portion of the dash and located within the engine compartment and attaching means between the support and dash, the dash being reinforced in the region of the attaching means.

2. In combination with a motor vehicle having a dash including a substantially vertical portion, an engine compartment forwardly of the dash and a removable hood covering the engine compartment, of a battery support supported upon a vertical portion of the dash and positioned forwardly of the dash and located within the engine compartment, means for attaching the support to the dash and means for reinforcing the dash in the region of the attaching means.

3. In combination with a motor vehicle having a dash, an engine compartment forwardly of the dash and a removable hood covering the engine compartment, of a battery support mounted on and positioned forwardly of the dash and located within the engine compartment, and a stiffening bar located on the rear face of the dash and connected to the battery support for reinforcing the dash.

4. In combination with a motor vehicle having a dash, an engine compartment forwardly of the dash and a removable hood covering the engine compartment, of a battery support suspended from and positioned forwardly of the dash and located within the engine compartment, said support comprising a base, uprights connected to said base adapted to engage the forward face of the dash throughout a substantial area to resist tear on the dash in the region of the connection with the support, and means for attaching the uprights to the dash at positions above and below the base.

5. A support for batteries and the like comprising a base, uprights connected to the base, braces connecting the uprights and base, and a clamping bail pivotally connected to the braces.

6. A support for batteries and the like comprising a base, uprights connected to the base, braces connecting the uprights and base, a clamping bail pivotally connected to the braces, and means for adjustably connecting the bail to the braces whereby the support may accommodate batteries of varying width.

7. In combination with the dash of a motor vehicle and the like, of a battery support for said vehicle comprising a base, upright members carried by the base, fastening means passing through the dash for connecting the upright members to the dash at spaced points of support, and a stiffening and reinforcing bar connecting at least two of said fastening means on the side of the dash opposite the upright.

8. A support for batteries and the like comprising a base, uprights connected to the base, said uprights being adapted for connection to a vertical supporting surface, braces connecting the uprights and base and constituting side frames for the support, and a clamping bail connected to said braces and providing means for clamping a battery or the like to said support.

9. A support for batteries and the like comprising a base, uprights connected to the base, said uprights being adapted for connection to a vertical supporting surface, braces connecting the uprights and base and constituting side frames for the support, a front cover member connected to the support, and a clamping bail hingedly connected to the braces and adapted to embrace the cover member.

10. A support for batteries and the like comprising a base, uprights connected to the base, said uprights being adapted for connection to a vertical supporting surface, braces connecting the uprights and base and constituting side frames for the support, a front cover member connected to the support, a clamping bail hingedly connected to the braces and adapted to embrace the cover member, and means for adjustably connecting the bail to the braces whereby the support may accommodate batteries of varying widths.

11. A support for batteries and the like comprising a base, uprights connected to the base, said uprights being adapted for connection to a vertical supporting surface, braces connecting the uprights and base and constituting side frames for the support, a U-shaped bail hingedly connected to the braces, and a cam lever pivotally connected to the bail for clamping the battery or the like between the bail and uprights.

12. A support for batteries and the like as defined in claim 8 characterized by the provision of a sheet metal cover means for enclosing the vertical faces of the battery.

MILTON W. PEHOTSKY.